June 1, 1926.

E. STUBBS

SHAPING MACHINE

Filed Feb. 28, 1920

Inventor
Everard Stubbs
by W. H. Brown
Attorneys

Patented June 1, 1926.

1,587,252

UNITED STATES PATENT OFFICE.

EVERARD STUBBS, OF SPRINGFIELD, VERMONT, ASSIGNOR TO THE FELLOWS GEAR SHAPER COMPANY, OF SPRINGFIELD, VERMONT, A CORPORATION OF VERMONT.

SHAPING MACHINE.

Application filed February 28, 1920. Serial No. 361,951.

The present invention relates to that type of machine tool commonly known as a shaper or shaping machine, which is a species of planing machine distinguished by the fact that the cutting tool is carried across the work by a carrier, usually called a "ram". The objects which I have had in view and the results which I have accomplished by this invention include the following: to shape flat or curved surfaces; to apply to the purpose of planing extending surfaces a circular cutter having notches and being rotated in the course of its cutting travel, whereby to dissipate the heat generated by the cutting action and thus make it possible to operate with a higher speed than formerly; to provide two cutters working simultaneously, thus allowing two cuts to be taken in each cycle and further conducing to rapidity of production; when two cutters are used as last stated, to reciprocate them oppositely to one another at all times whereby to balance vibrations due to the reciprocating parts, to equalize stresses and strains in the driving mechanism, and to utilize effectually and substantially continuously the power available for the cutting action; to relieve the cutter or cutters from the work during the non-cutting strokes in a manner which avoids pressure upon the work, and is at the same time of simple character; in a machine having two cutters, to furnish a simple means whereby one of them may be put out of action or into action at will; and generally to provide driving and controlling means and other auxiliary parts and mechanisms necessary to make operative and effective a machine for accomplishing the foregoing objects.

The precise nature of the invention and the manner in which the foregoing objects are accomplished thereby are explained in the following description of a specific machine which I have produced embodying the invention, drawings of which are furnished herewith. The invention to which I make claim and desire to protect consists in all the novel features, combinations and details of said machine, and all mechanisms, means, and devices equivalent in purpose, result and mode of operation to said machine and the parts thereof.

In the said drawings.

Figure 3 is a horizontal section and plan taken on line 3—3 of Figure 2.

The same reference characters indicate the same parts wherever they occur in all the figures.

Figure 1:
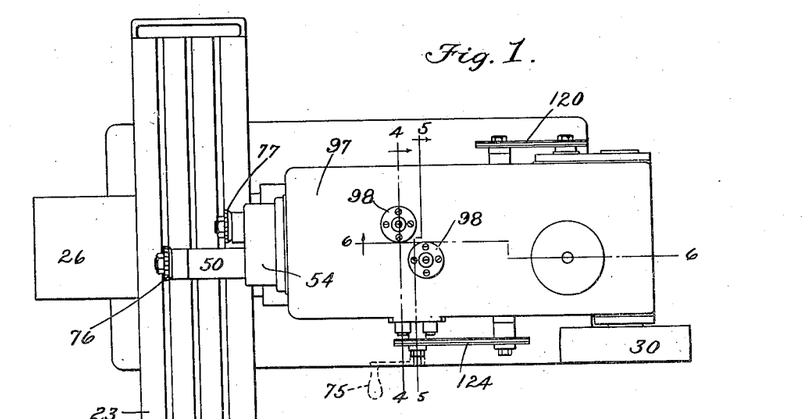
Figure 1 is a plan view of the machine there represented.
Figure 2:
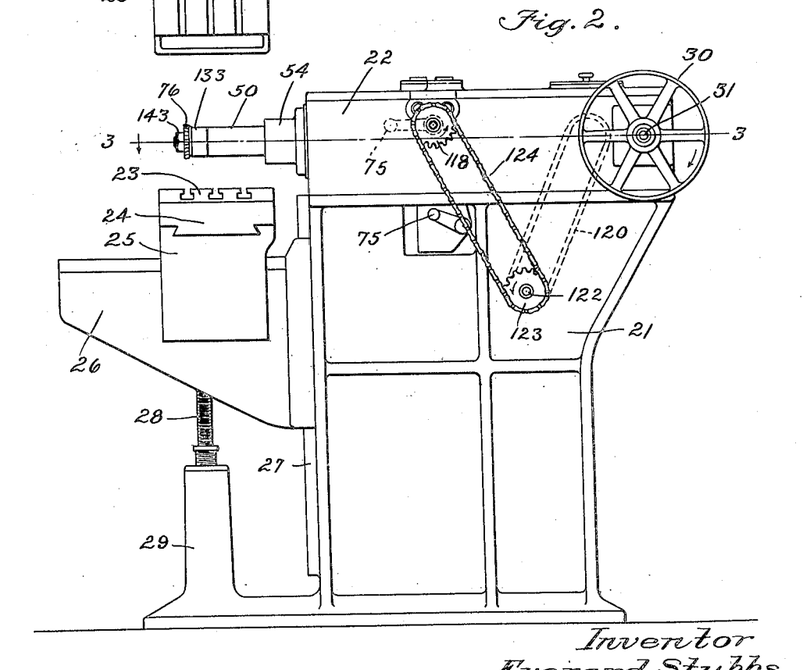
Figure 2 is a side elevation of the machine.

Referring first to Figures 1 and 2, 21 represents the base frame or pedestal of the machine on top of which is supported the housing or casing 22 wherein are contained the rams and the mechanism for respectively reciprocating them and rotating the cutters. 23 is the work supporting table mounted on a carriage 24 which is adapted to travel lengthwise, and hence transversely to the direction of reciprocation of the cutters, in a bed or cross feed slide 25. The latter is mounted on a bracket 26 with provision for adjustment in or out, that is, in the direction of reciprocation of the cutters, and the bracket is adapted to slide vertically on the guide 27 at the front of the machine and is supported in an adjustable manner by a screw 28 rising from the foot 29. It may be understood without further illustration or explanation that means are provided for moving the cross feed slide in and out, for turning the vertical adjusting screw 28 (or equally an adjusting nut meshing with said screw within the bracket 26) to raise and lower the bracket, and for automatically driving the work carriage lengthwise while the cutters are working. For this purpose I may employ such means as are commonly used to drive the work tables and carriages of ordinary horizontal milling machines, or indeed any other suitable mechanism. I do not claim any specific means for causing traverse of the work table, and my only claim herein to the reciprocating or traveling work table is as a part of the combination of which the novel cutter or cutters and the means for driving, rotating, and relieving them are also parts.

Figure 11:
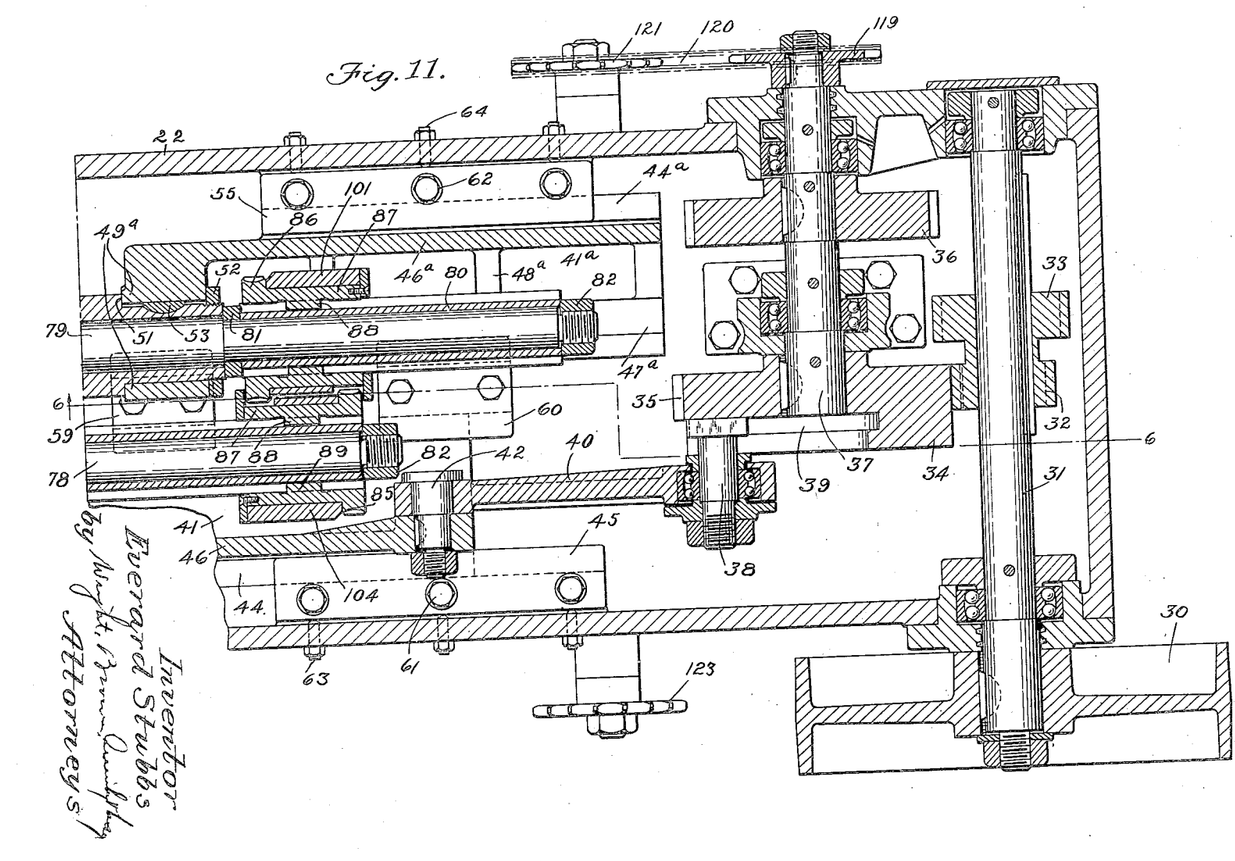

30 is a belt pulley on a counter shaft 31, which passes through the rear end of the housing 22 (Figures 3 and 11) and carries a sliding gear unit 32, 33 splined upon it for driving the crank disk 34 through either the gear element associated with said disk or through another gear 36 secured to the shaft 37 which carries said crank disk. The gear elements 32 and 35 are mating gears having one ratio and the gear elements 33 and 36 are likewise mating gears having a different ratio, and either pair may be brought into action for driving the cutter rams at different rates of speed. It is to be understood, although not particularly illustrated, that suitable means are to be provided for shifting the combined gear elements to complete the drive through either gear 35 or 36, or to place them in neutral position. A forked lever or any other usual or operative gear shifting means is applied for this purpose.

Crank disk 34 carries a crank pin 38 which is clamped in a radial slot 39 in the disk to permit of its being adjusted radially whereby to shorten or lengthen the strokes of the rams in accordance with the dimensions and character of the work in hand. Any other character of adjustable crank may, of course, be here used. This crank disk is joined by a connecting rod 40 with one of the cutter operating slides or rams 41, the connection being made by a wrist pin 42.

Figure 4:
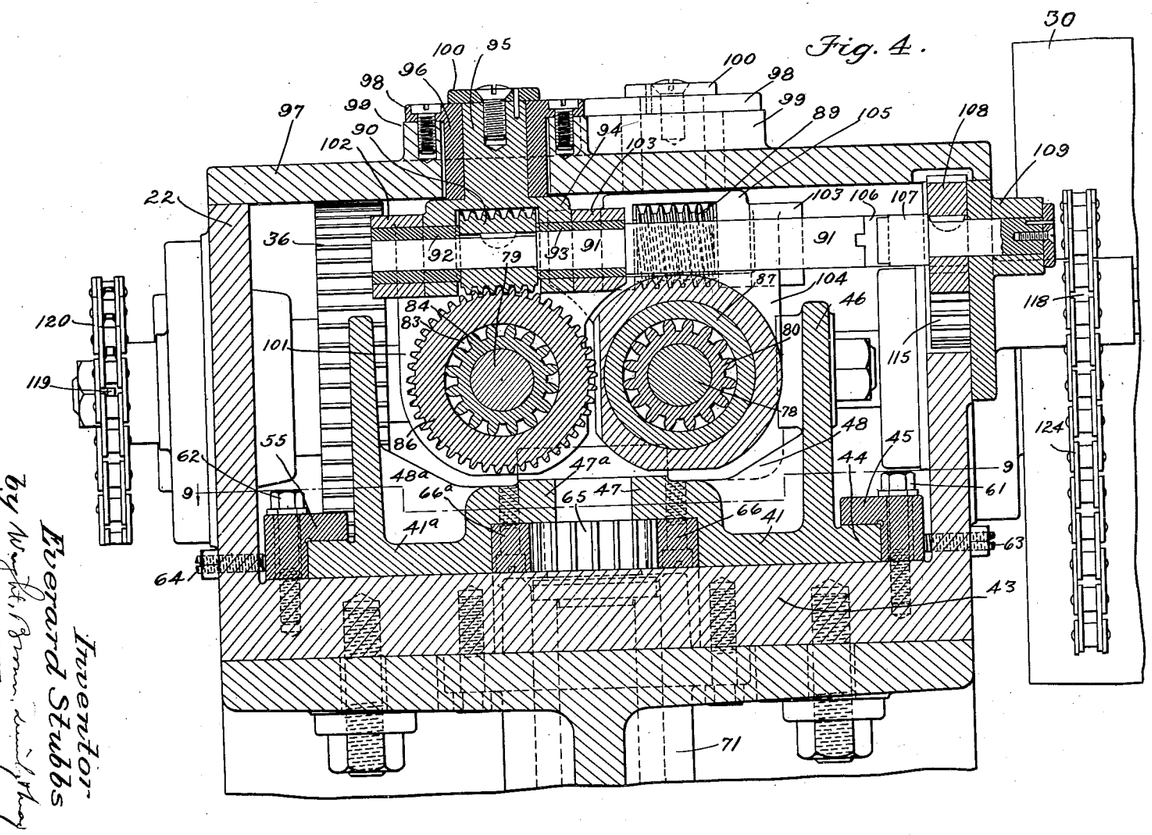
Figures 4 and 5 are vertical cross sections taken on lines 4—4 and 5—5, respectively, of Figure 1.

The ram has a flat bottom which rests on the bottom or base 43 of the housing (Figures 4 and 5), an outer rib or lip 44 which is confined by a guide 45, an upstanding web 46, a raised inner lip 47, stiffening ribs 48 between the bottom web and inner lip, and a lug 49 (Figures 3 and 10) projecting inwardly from the forward end of the web 46. This lug is apertured and it receives the rear end of a sleeve 50, being confined between a shoulder 51, and a nut 52 on said sleeve, there being a key 53 between said lug and the sleeve to prevent rotation of the latter. Said sleeve passes through a guideway 54 in the front end of the housing in which it has a free sliding fit.

Figure 5:
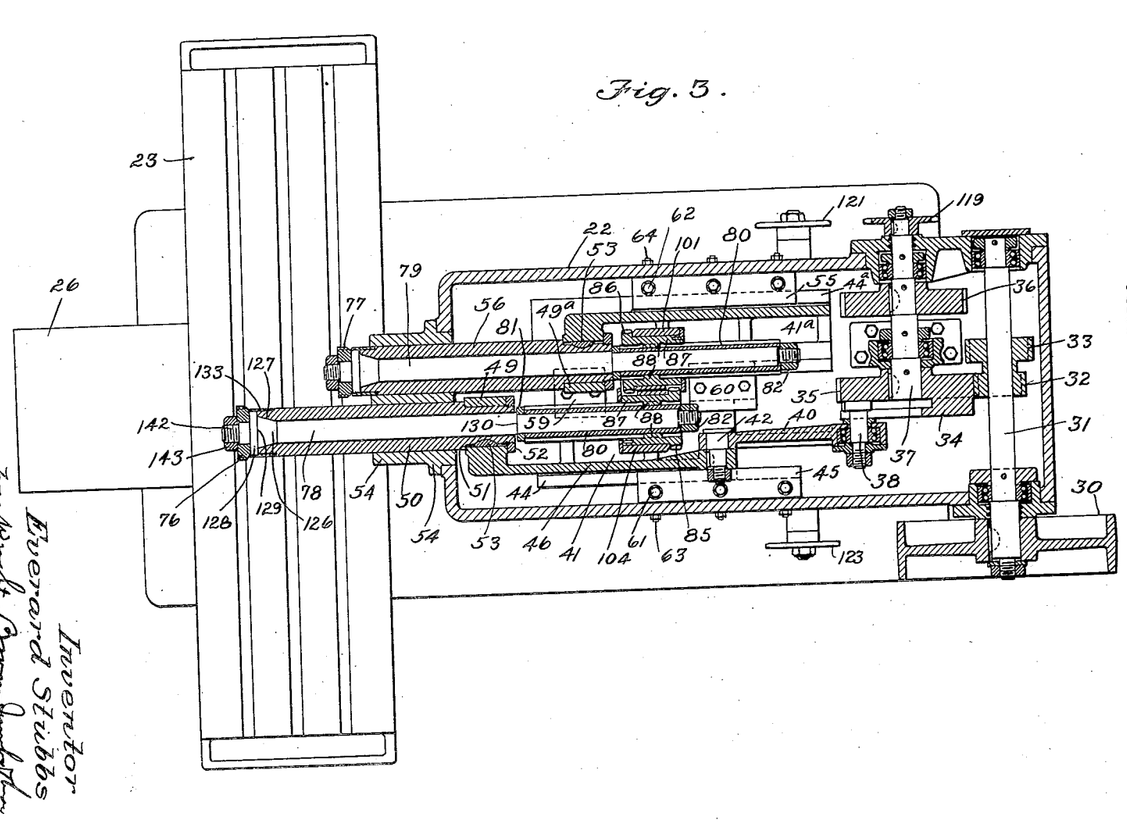

A second ram $41^a$ is provided opposite to the ram 41, and substantially like it in all respects except that it is reversed in construction and position (see Figure 5). Corresponding parts of the ram $41^a$ are designated by the same numerals, modified by the exponent "a" as are applied to the parts of the ram 41. It is likewise guided as to its outer lip by a guide designated as 55, and it is engaged with a sleeve 56 like the sleeve 50 and in a similar manner. Between the inner lips 47 and $47^a$ of the two slides or rams are guide blocks 57 and 58 (Figure 6) which rise from the housing base and on which are fixed holding plates 59 and 60, respectively which overhang said lips. The outer guiding members 45 and 55 are adjustable in and out, being held upon the base by screws 61, 62 which pass through slots in the guides, and being backed up by set screws 63, 64 which pass through the sides of the housing.

Figures 6, 7:
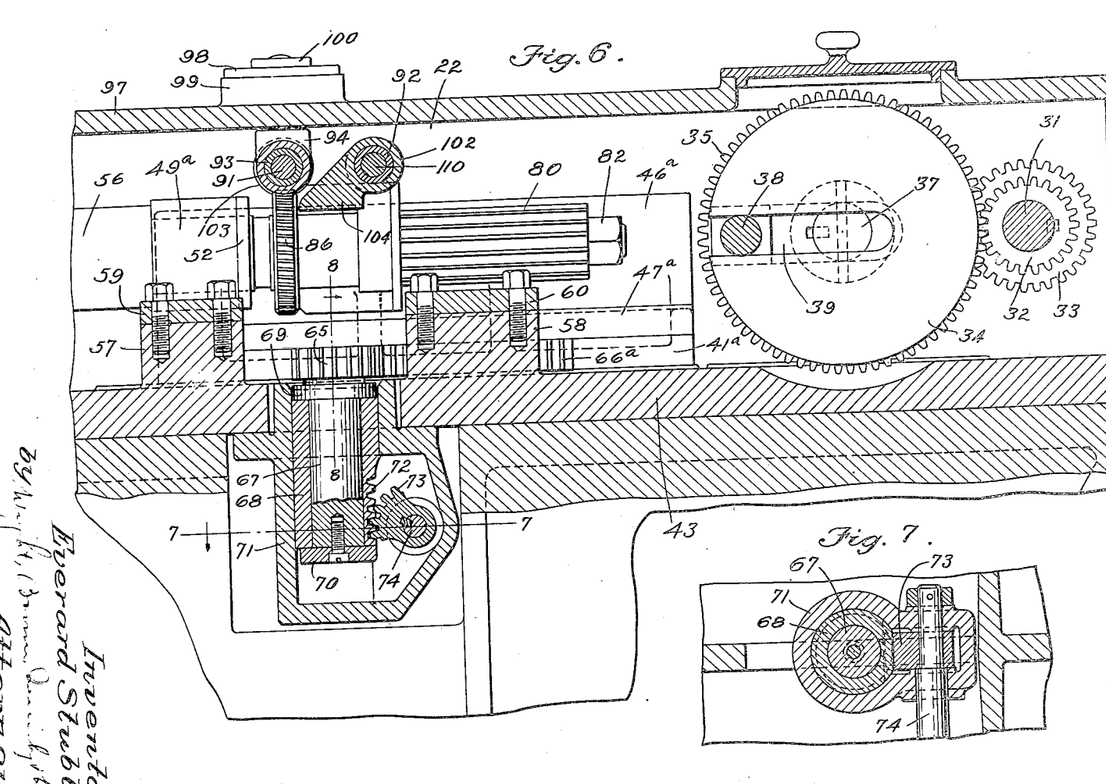
Figure 6 is a vertical longitudinal section taken on line 6—6 of Figures 1 and 11.
Figure 7 is a detail view of the means for coupling and uncoupling the two cutter carrying rams, being a horizontal section taken on line 7—7 of Figure 6.
Figures 8, 9:
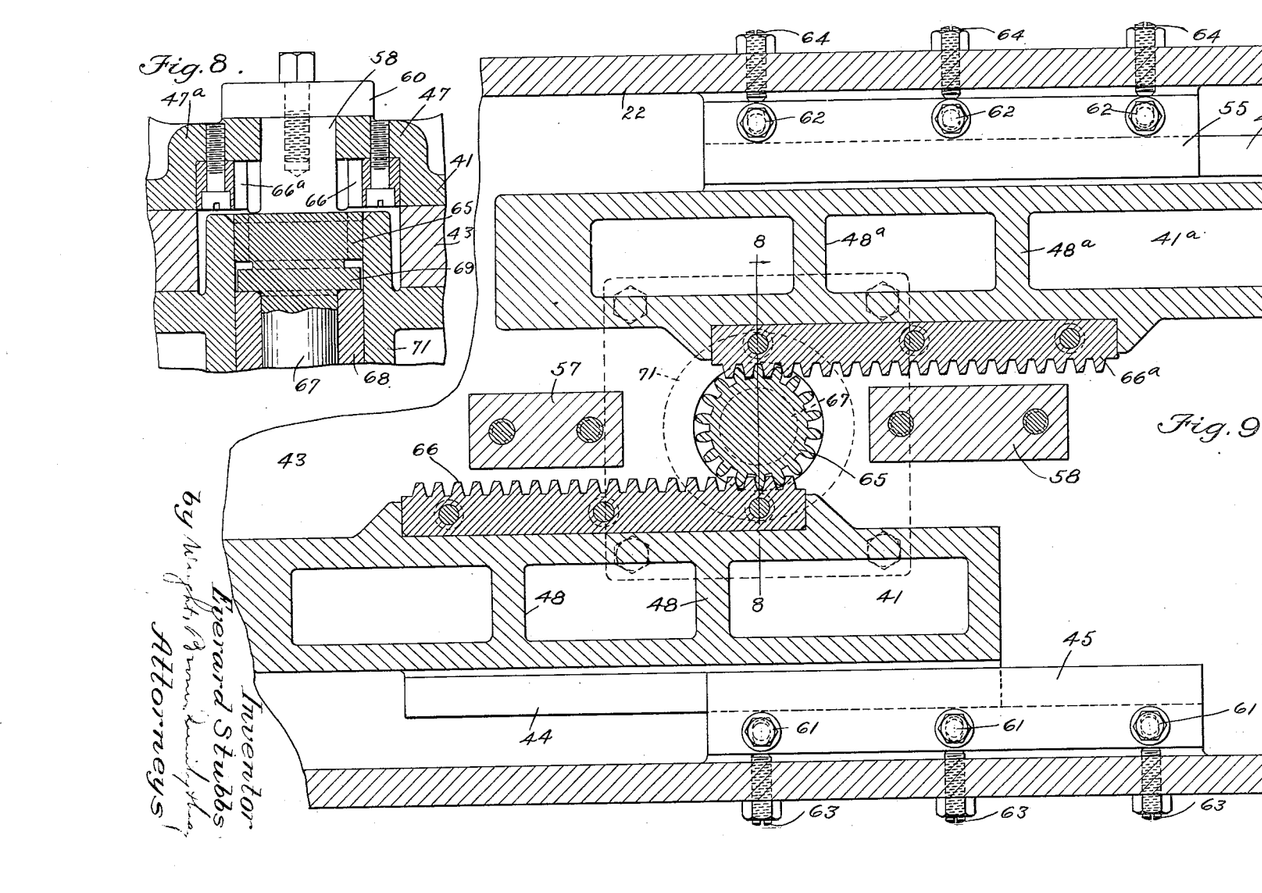
Figure 8 is a vertical section taken on line 8—8 of Figure 6 showing a part of the same means.
Figure 9 is a horizontal section and plan on line 9—9 of Figure 4.

Slide or ram $41^a$ is reciprocated simultaneously with and oppositely to the ram 41 by an interposed pinion 65 which engages rack bars 66 and $66^a$ secured to the respective slides. This pinion is mounted upon a stud 67 (Figures 6, 7, and 8) which is fitted rotatably within the sleeve 68 and has a flange 69, resting on the upper end of the sleeve and carries a detachable cap disk 70 underlying the lower end of said sleeve. The sleeve fits and is adapted to slide endwise in a guideway 71 secured to the under side of the housing base and hanging down therefrom; and this sleeve carries a series of teeth 72 which mesh with the teeth of a gear segment 73 secured to a shaft 74 which passes through the outside of the base and has a handle 75 by which it may be turned to raise or lower the pinion. When raised, as shown in Figure 6, the pinion couples the two rams causing them to travel simultaneously in the manner described, and when lowered as shown in Figure 8, it uncouples the rams leaving only the ram 41 to be reciprocated by the driving mechanism.

Figure 12:
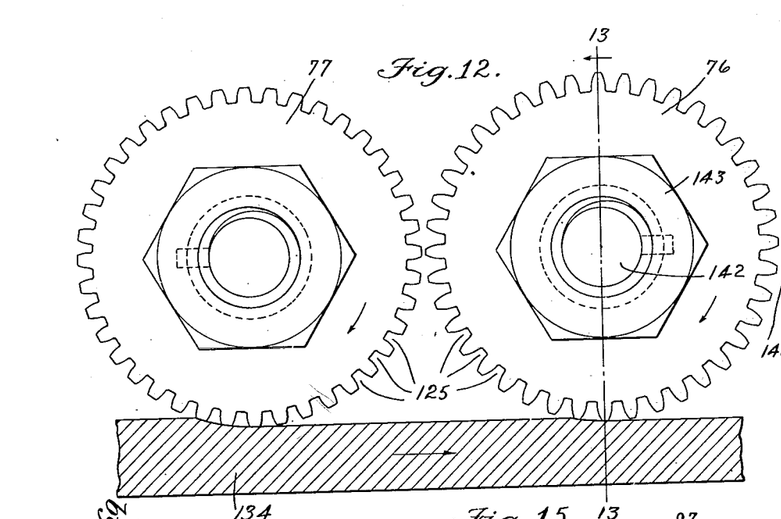
Figure 12 is a detail elevation, as seen from the front, of the two cutters in action, the work piece being shown in section.

The cutting tools or cutters are represented by 76 and 77 (Figures 3 and 12). They are secured upon the ends of spindles 78 and 79 which pass through the sleeves 50, 56, respectively, and project from the inner ends of said sleeves. On the projecting inner end of each of the tool spindles is mounted a sleeve 80, which is somewhat longer than the longest stroke of the rams and is clamped between a collar 81 at one end on the spindle and a nut 82 at the other end, being firmly secured thereby so that it can not turn about the spindle, and each of these sleeves is provided with a number of straight longitudinal grooves 83 and ribs 84, as shown best in Figures 4, 5, and 6, and these sleeves pass through worm wheels 85 and 86, respectively, each of which has a long hub 87 and a number of inwardly projecting key ribs 88 which occupy certain of the grooves 83 in which they fit slidingly (Figure 5).

The worm wheel 85 meshes with a worm 89 and the worm wheel 86 meshes with a worm 90. These two worm and gear couples are alike and are mounted similarly to one another, wherefore the same reference characters will be used for the corresponding parts associated with both. The worm 90 (Fig. 4) is keyed to a shaft 91 which has its bearings in sleeves 92 and 93 in the arms of the knuckle 94. The knuckle has a shank 95 mounted rotatably in a bearing sleeve 96 which passes through the cover plate 97 of the housing and has a flange 98 supported on and secured to a boss 99 on the cover. A cap plate or washer 100 secured to the shank overlies the bearing sleeve and supports the knuckle. The sleeves 92 and 93 which contain the worm shaft also serve as pivots on which is swiveled a hanger 101 providing a bearing in which the hub 87 is held and turns, said hanger having pierced lugs or arms 102, 103 which receive the pivot sleeves. By this means the inner end of the cutter spindle is mounted in a suspended bearing having the characteristics of a Cardan joint in that it permits the spindle to be swung in any direction about the intersecting axes of the shank 95 and the worm shaft, and thus permits the movement of the cutter in backing off from the work later described in detail. Such of this movement as occurs about the axis of the shank causes the worm wheel and worm to swing in unison, while the movement about the axis of the worm shaft carries the worm wheel with it, whereby the backing off movement of the cutter may take place without altering in the least the character of mesh of the worm and wheel.

The worm wheel 85 and its worm 89 are supported by a hanger 104 and knuckle 105 precisely like the hanger and knuckle already described.

The shaft 91 of worm 90 is connected through a coupling 106 with a shaft section 107 carrying a pinion 108 and mounted in a fixed bearing 109 (Figure 4) while the shaft 110 of worm 89 is connected by a coupling 111 with a shaft section 112 carrying a pinion 113 and journaled in a fixed bearing 114. The couplings 106 and 111 here shown are of the Oldham type and are designed to permit such lateral shifting of each worm shaft with respect to its coupled driving shaft as may occur when the cutters are backed off or relieved, and thus avoid binding of either the worm shaft or the cutter spindle. Any other type of coupling having like effect may be used in the place of that here shown.

Figure 15:
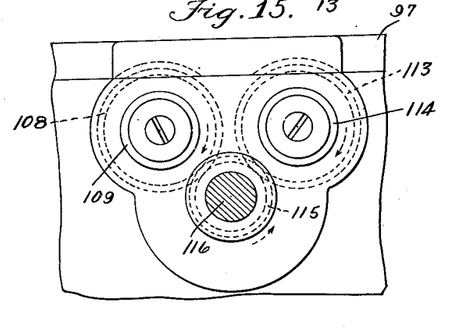
Figure 15 is a detail view of the drive for the cutter rotating mechanism, being specifically a section on line 15—15 of Figure 5.

Both pinions 108 and 113 mesh with a pinion 115 (Figures 5 and 15) on a shaft 116 which occupies a bearing 117 on the housing and carries a sprocket wheel 118 driven from the crank shaft 37 through a sprocket and chain drive consisting of a sprocket 119 on said shaft, chain 120, sprocket 121 on an intermediate shaft 122 which passes through the base from side to side, a sprocket 123 on the other end of said shaft and a chain 124 between the sprockets 123 and 118. Thus the worms are rotated in the same direction, and as they have the same inclination of pitch the cutters are likewise both rotated in the same direction, which is that indicated by arrows in Figure 12. It is to be understood, however, that if desired the cutters may be rotated in relatively opposite directions by substituting for either of the worms one having an opposite inclination of pitch, or by reversing the direction of rotation of either of them by well understood means.

Figure 13:
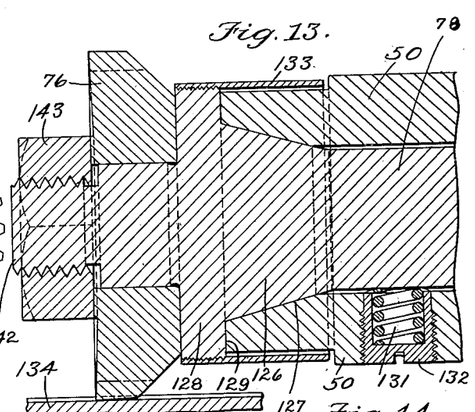
Figure 13 is a sectional view through one of the cutters taken on line 13—13 of Figure 12.

By reference to the latter figure and Figure 13 it will be seen that the cutters are disks having peripheral cutting edges, and that these cutting edges are interrupted at frequent and regular intervals by notches 125. The purpose and effect of these notches is to reduce the width of the chip being cut, to improve the efficiency of the cutter and to minimize the generation of heat. The notches may be of any number, shape, and arrangement provided only they are numerous enough to effect the desired purpose, above set forth, and to leave metal enough between them to support the cutting segments strongly. The rotation of the cutters, which may take place continuously while the machine is in operation, constantly changes the part of the cutter which is in action, limiting the duration of the action of each part and so contributing to the effect of avoiding overheating of the cutter. These factors permit a higher cutting speed to be used than has heretofore been known.

During the return or non-cutting strokes, the cutters are relieved, and may be wholly separated, from the work so that in their return they do not exert pressure on the work. To effect this backing off or relieving action each cutter spindle is loose within its guiding sleeve (50, 56) having no bearing thereon except at its forward end. There it has a conical part 126 which is seated in a taper bearing 127 in the sleeve, and a shoulder 128 which contacts with the end 129 of the sleeve and is the means which takes the thrust of the sleeve during cutting. The distance between shoulder 128 and collar 81, the position of which is fixed by a shoulder 130 on the spindle, is greater than the length of the sleeve, whereby there is lost motion between the sleeve and the spindle. As the strokes of the cutter in both directions are transmitted from the ram through the sleeve, it follows that at each reversal of the ram the cutter spindle is not moved until this lost motion is taken up. Thus at the end of the cutting stroke the cutter and its spindle rest until the inner end of the sleeve strikes the collar 81, and in the movement of the sleeve which then occurs the taper seat 127 is withdrawn from the cone 126, leaving the spindle loose. At this time a spring 131 shown in Figures 13 and 14, which is seated in the sleeve and bears against the spindle, raises the cutter and adjacent end of the spindle and so relieves the pressure of the cutter on the work. It is to permit this movement of the spindle to take place that the supporting and driving means for the rear part of the spindle, or that part of the spindle alone, are supported by means embodying some sort of universal joint. For convenience of construction the socket which contains spring 131 is provided in a thimble 132 screwed into a tapped hole in the under side of the sleeve.

Figures 10, 16, 17, 18, 19:
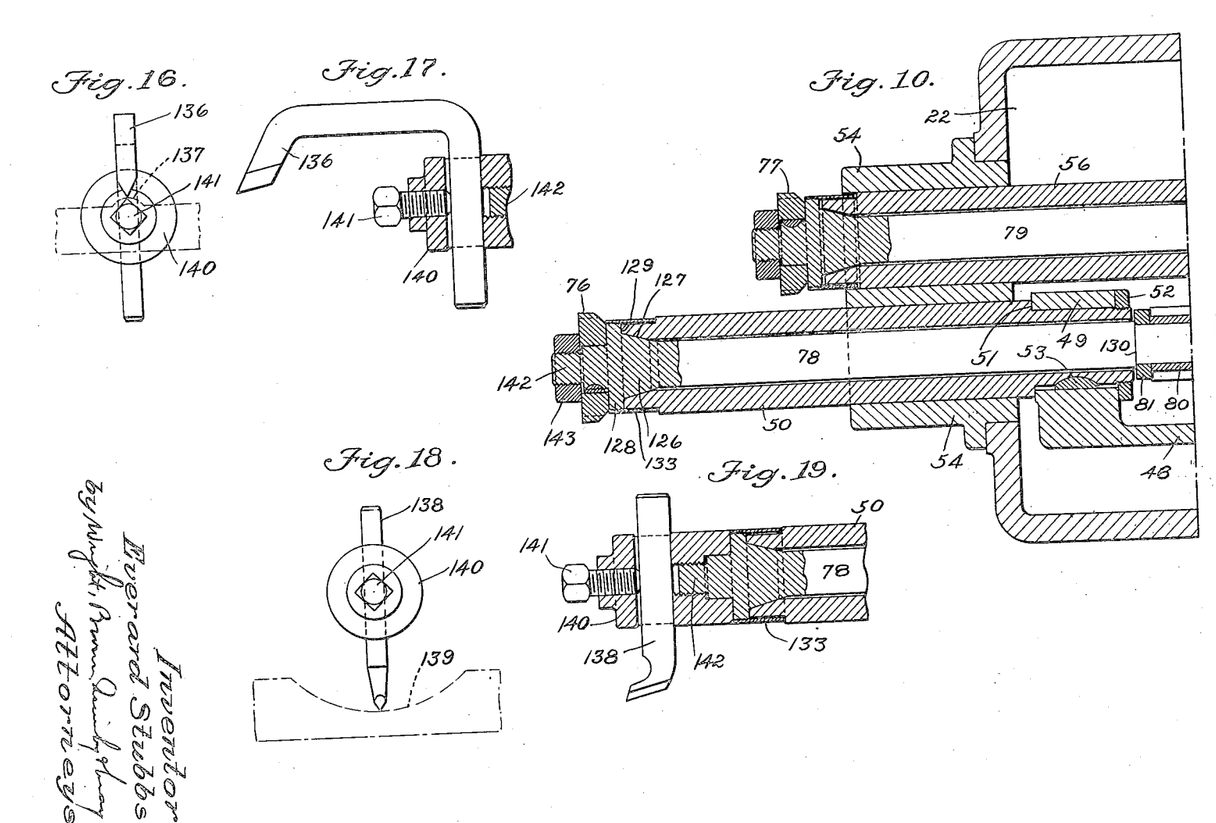
Figures 10 and 11 collectively represent a horizontal section similar to that represented in Figure 3 but on a larger scale, Figure 10 showing the left hand end of the assemblage thus represented and Figure 11 the right hand end and middle thereof.
Figures 16 and 17 are respectively a front elevation and a side elevation, partly in section, of a tool holder and tool adapting the machine to shape convex surfaces.
Figures 18 and 19 are corresponding views showing the machine adapted for shaping concave surfaces.
Figure 14:
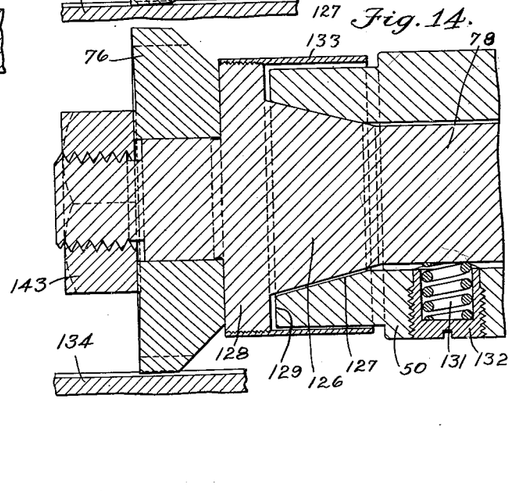
Figure 14 is a view generally similar to Figure 13 but differing therefrom in that it shows the cutter relieved or backed off from the work in the course of its return stroke.

On the forward stroke of the ram, the sleeve is moved forward until the taper seat engages and centers the cone part of the spindle and the end of the sleeve bears against the thrust shoulder. These conditions of centering and relieving the spindle are indicated in Figures 3 and 10, and are more clearly shown on a large scale in Figures 13 and 14, Figure 13 showing the spindle seated and making its cutting stroke, and Figure 14 showing it backed off and in the course of its return stroke. A shield 133 is attached to the thrust collar of the spindle and surrounds the adjacent end of the sleeve to exclude grit from the bearing surfaces. At slow speeds the friction and inertia of the cutter spindles is great enough to hold them at rest at each reversal until the lost motion of the sleeve is taken up; and at high speeds the momentum of these parts carries them forward to their abutting surfaces, taking up the lost motion automatically.

This mechanism effects the desired end of wholly relieving the pressure of the cutter from the work and is essentially of simple character. In the cutting stroke the cutter is rigidly centered and pressed forward. The angle of taper of the complemental seat and cone is, of course, great enough to avoid sticking or gripping, that is, it is wider than a gripping taper, whereby in the return strokes the sleeve may be withdrawn freely.

Figures 20, 21, 22:
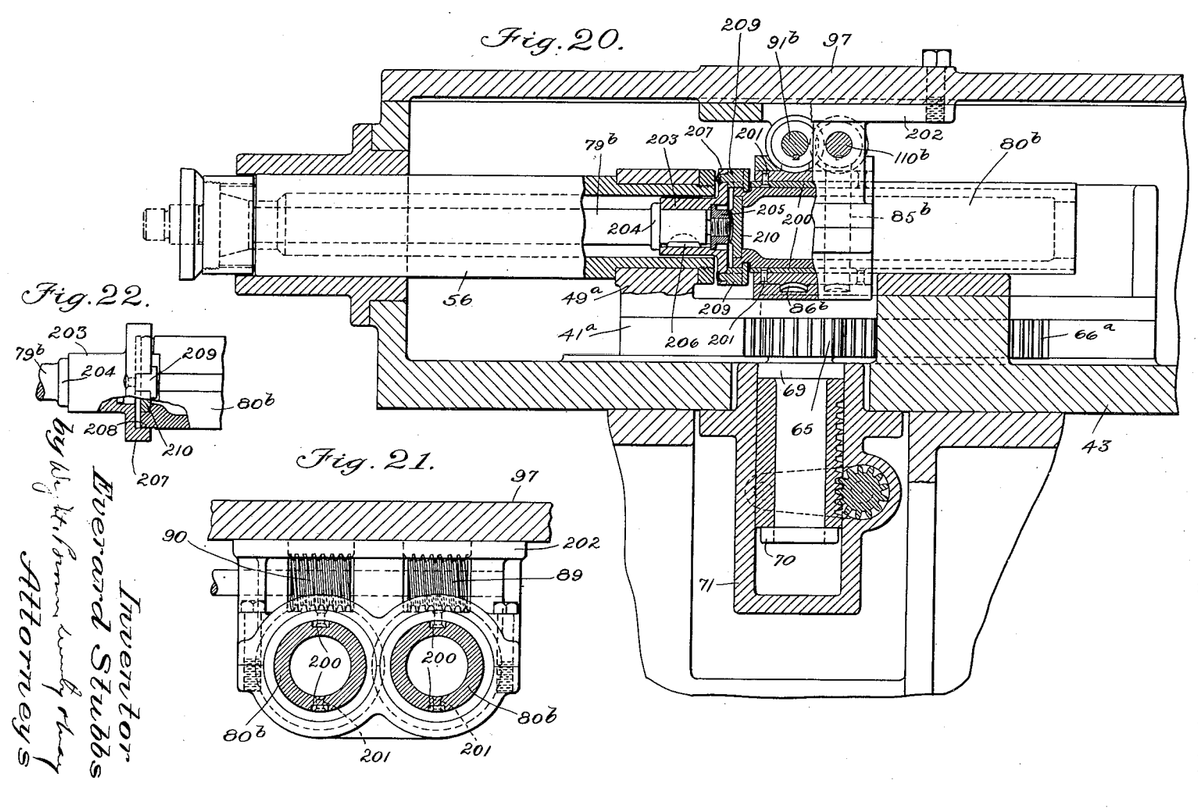
Figure 20 is a longitudinal vertical section showing an alternative mode of mounting the cutter spindles to permit angular movement thereof.
Figure 21 is a cross section and an end view of the spindle rotating mechanisms as seen from the right of Figure 20.
Figure 22 is a plan view of a detail of the mechanism illustrated in Figure 20.

Turning to Figures 20, 21 and 22 there is shown an alternative means by which each of the cutter spindles may be connected with the mechanism which rotates it with a form of universal joint which permits the angular or swinging movement of the spindle necessary to relieve the work, and also allows the rotation-imparting mechanism to be rigidly supported. In these figures the parts which are equivalent to parts already described are designated by the same reference numerals modified by the letter "b". Here $80^b$ represents the rotation-imparting shaft section for each spindle. The two shaft sections are mounted slidingly in worm wheels $85^b$ and $86^b$, respectively, and have longitudinal grooves in which are slidingly contained keys 200, the latter being preferably secured by rivets 201, as indicated in Figure 20, inside the worm wheels. The worm wheels mesh with driving worms 89 and 90, on shafts $110^b$ and $91^b$, respectively, which are held in fixed bearings depending from a plate 202 rigidly fastened to the cover plate 97; and the bearings for the worm wheels are likewise suspended from the same plate. This supporting structure is a rigid structure, wherein the worms and worm wheels are held without capacity for angular movement of any sort except rotation about their own axes.

The provision for the necessary swinging movement of each spindle is made by a universal joint between the spindle and the shaft section $80^b$, which comprises a sleeve 203 fitted to the cutter spindle $79^b$, between a collar 204 thereon and a nut 205, and being restrained from rotation by a key 206. The sleeve 203 has a flange 207 which embraces the adjacent end of the shaft section $80^b$ and has a bearing upon a spherically curved zone 208 thereof. To this flange are secured keys 209 which enter recesses in the shaft section $80^b$ adjacent to the spherical zone thereof and serve both to transmit rotation from said shaft section to the spindle, and also to move the shaft section endwise with the spindle when the cutter is making its cutting stroke. The backward longitudinal movement of the shaft section is imparted by the pressure of the nut 205 against a plate 210 secured to the adjacent end of the shaft section and having a spherically curved surface complemental to the adjacent surface of the nut. Enough lost motion is provided between this plate and the nut, on the one hand, and between the keys 209 and the recesses entered by them, on the other hand, to effect the same disengagement and reengagement between the cutter spindle and its surrounding sleeve, and the relieving movement of the cutter as that already fully described.

It is apparent from the foregoing description that the machine may be operated with either one or two cutters, and that when two cutters are used they reciprocate simultaneously but always in opposite directions. This opposite reciprocation balances vibration due to the acceleration of the reciprocating parts, and also causes one cutter to be in cutting action substantially all the time, but only one cutter to act at any one time. Thus the power required to operate the machine is not materially greater than that needed to drive a single cutter, while the working effort is applied substantially all the time, making for uniform expenditure of power and avoidance of sudden strains being thrown on the machine. The use of two cutters of course enables two cuts to be made at one time on the work piece, as for instance a roughing cut and a finishing cut, and thus halve the time, other things being equal, required to finish a piece. During the operation of the cutters, which of course travel in fixed paths, the work piece, represented by 134 (Figure 12) is continuously moved by the travel of the work table at a rate properly proportioned to the speed of the cutters to produce the required continuity of the finished surface.

Other cutters may be applied in place of the disk cutters heretofore described for doing special work, such as shaping convex or concave surfaces. Figures 16 and 17 show a cutter 136 arranged for shaping a convex bead 137 on the work piece; and Figures 18 and 19 show a cutter 138 arranged to shape a concavity 139. Tools of this and other types are clamped in a holder or head 140 by a set screw 141, and the head is secured upon the spindle, conveniently by being screwed on the reduced and threaded end 142 in place of the disk cutter and the retaining nut 143 which holds the disk cutter in place. But in any case, whatever the character of work performed, whether in shaping plane or curved surfaces, the relieving or backing off mechanism operates in the manner and to the effect already described in separating the tool from the work from any angle which the work may be presented.

The foregoing description has been directed to the particular machine shown in the drawings, in which the travel of the cutters is horizontal and the cutters are above the work piece. Such terms as "vertical" and "horizontal", and other terms indicating relative position and movement used in the foregoing specification are to be construed accordingly and are not to be taken as limiting the invention in any way, since the same principles and essentially the same means are applicable in cases where the cutters operate vertically or at an inclination, as well as horizontally, and whether they are above, below, or beside the work piece, and also whether the work piece is fed in a straight line or in a curved path.

What I claim and desire to secure by Letters Patent is:

1. A surface shaping machine having a disk like cutter, with means for reciprocating said cutter lengthwise of its axis, and rotating it about its axis, whereby the portion of the cutting edge in action is changed, and the heat generated in the cutting action is dissipated, and a work holder movable transversely to the axis of said cutter.

2. A surface shaping machine having a work holder and a disk like cutter, with means for effecting relative planing movements between the cutter and work holder lengthwise of the axis of the cutter, means for supporting and moving a flat-surfaced work piece transversely to the direction of such planing movements, and means for rotating the cutter about its axis, said cutter having notches or indentations interrupting its cutting edge and such cutting edge being substantially wholly in a plane perpendicular to such axis.

3. A shaping machine constructed and adapted for planing or shaping extended surfaces comprising a work holder, adapted to support a flat-surfaced work piece and to feed the same transversely to the direction of planing traverse, a cutter holder, means for effecting relative planing transverse between said holders, and a cutter having an interrupted cutting edge in a plane transverse to the direction of such traverse with spaces between the parts thereof for dividing the cut.

4. A shaping machine constructed and adapted for planing or shaping extended surfaces comprising a work holder, a cutter spindle arranged to travel lengthwise across said work holder, a cutter carried by said spindle having an interrupted cutting edge with intermediate air spaces, and means for so moving said cutter transversely to the direction of spindle travel as to bring different parts of its cutting edge successively into action and at the same time to bring out of action other parts of such edge.

5. A shaping machine comprising a work holder adapted to support a work piece having an extended surface, a cutter spindle arranged to travel across said work holder, a cutter having a circular periphery with neat dissipating notches therein, a means for moving said spindle endwise to carry the cutter across the surface of the work, and means for simultaneously rotating the cutter over the work whereby to change the acting part of its cutting edge.

6. In a surface shaping machine, the combination with a holder adapted to support a work piece having extended surface and to travel transversely to the direction of cutting travel, a cutter holder, means for effecting relative back and forth movement between said holders for cutting, and a disk cutter mounted on the cutter holder, of means for cutting said disk cutter in the course of its cutting travel for changing the acting part of its edge.

7. In a surface shaping machine a work table adapted to be moved in a straight line during the action of cutting and being adapted also to support a work piece having an extended surface, a cutter holder movable across said table transversely of the operative travel of the latter, a disk cutter having an interrupted peripheral cutting edge, and means for rotating the cutter during the cutting travel in a manner causing that part of the cutting edge next to the work to move oppositely to the direction of travel of the work table.

8. In a shaping machine having two cutter carriers movable reciprocatively side by side, planing cutters mounted on said carriers, means for moving said carriers back and forth, and a work holder adapted to support a work piece in position to be cut by the cutters, said table being movable in the course of the shaping operation transversely to the travel of the cutters, whereby to bring both cutters into action successively on the same piece.

9. A duplex shaping machine including two back and forth moving cutter carriers, mechanism for moving one of said carriers back and forth, and intermediate gearing between the carriers whereby the one so moved drives the other.

10. A shaping machine embodying two cutter carriers moving side by side, a rack connected to each of said carriers, an intermediate pinion between and meshing with both racks, whereby movement of both carriers takes place at once but in relatively opposite directions, and driving means coupled with one of said carriers.

11. A shaping machine embodying two cutter carriers movable side by side, a rack connected to each of said carriers, an intermediate pinion between and meshing with both racks, whereby movements of said carriers take place in unison but in relatively opposite directions, and driving means coupled with one of said carriers, said pinion being disconnectible at will to cause action only of that carrier which is coupled to the driving mechanism.

12. In a duplex shaping machine two cutter actuating rams reciprocatively mounted side by side, each having a rack facing toward the other, an intermediate pinion between and meshing with both of said racks, and means for withdrawing said pinion to place it out of mesh with one of the racks.

13. In a duplex shaping machine two cutter actuating rams reciprocatively mounted side by side, each having a rack facing toward the other, an intermediate pinion between and meshing with both of said racks, a bearing for said pinion mounted with capacity for moving axially, and means for so moving said pinion whereby to disengage it from or engage it with one of said racks.

14. A shaping machine comprising two reciprocative cutter holders arranged side by side, planing cutters mounted on the respective holders and having cutting edges transverse to the movements thereof, and means for moving said holders simultaneously in opposite directions comprising a rotating crank, a connecting rod coupled to said crank and to one of said holders, and a motion reversing transmission connection between the two holders.

15. In a surface shaping machine a disk like cutter, and means for simultaneously reciprocating and rotating said cutter, comprising a spindle on which the cutter is secured, a reciprocatable ram connected to said spindle, a sleeve secured non-rotatably upon said spindle, a gear element rotatably mounted and having a longitudinal sliding engagement with said sleeve, a holder preventing axial movement of said gear element, and means for rotating the gear element.

16. In a shaping machine the combination with a cutter and a spindle bar holding said cutter, of means for applying cutting pressure to the cutter and relieving it from the work, comprising a guide member having provision for relative movement endwise of the cutter spindle, complemental thrust abutments and tapered seating surfaces on the spindle and guide member respectively, and means for moving said guide member alternately in opposite directions.

17. In a shaping machine the combination with a cutter and a spindle or bar holding said cutter, of means for applying cutting pressure to the cutter and relieving it from the work, comprising a guide member having provision for relative movement endwise of the cutter spindle, complemental thrust abutments on the spindle and guide member, respectively, means for moving said guide member alternately in opposite directions, and means interposed between the spindle and guide tending to displace the spindle laterally.

18. In a shaping machine, a planing cutter, a holding bar therefor and means for respectively sustaining the cutter in its cutting action and relieving it from the work, embodying a guide having a tapered seat surrounding the cutter bar, the latter having a tapered part complemental to said seat and being otherwise clear of the guide and adapted to move relatively thereto, and means for effecting a sufficient lengthwise movement between the cutter bar and guide to cause contact and separation between said seating face and tapered part.

19. In a shaping machine, a planing cutter, a holding bar therefor and means for respectively sustaining the cutter in its cutting action and relieving it from the work, embodying a guide having a tapered seat surrounding the cutter bar, the latter having a tapered part complemental to said seat and being otherwise clear of the guide and adapted to move relatively thereto, means for effecting a sufficient lengthwise movement between the cutter bar and guide to cause contact and separation between said seating face and tapered part, and resilient means acting upon the cutter bar tending to displace it laterally with respect to the guide.

20. A shaping machine comprising an endwise movable cutter spindle, a guide sleeve through which said spindle passes and of which the internal diameter is greater than the diameter of the spindle, a cutter on said spindle, the latter having a thrust abutment and tapered part near the cutter, and the guide sleeve having a thrusting part and a tapered seat complemental to said abutment and tapered portion, respectively, and a ram connected to said sleeve and movable to reciprocate the latter and thereby the spindle, said spindle having a stop to receive the thrust of said sleeve in the direction away from the cutter, said stop being positioned to allow lost motion between the sleeve and spindle.

21. In a shaping machine an endwise movable cutter spindle, a cutter on one end thereof, a guide for the opposite end of the spindle constructed to permit swinging movement of the cutter carrying end thereof, and means for reciprocating said spindle and at the same time positioning and thrusting upon the cutter during its cutting strokes and permitting relief of the cutter upon the non-cutting strokes, comprising a sleeve loosely surrounding the cutter holding end of the spindle and means for reciprocating the sleeve, said spindle having abutments between which the sleeve is movable endwise with limited lost motion, and the sleeve and spindle having complemental tapered seating surfaces at the end nearest the cutter.

22. A shaping machine comprising a work support, a spindle adapted to move endwise and rotatably beside a work piece mounted on the work support, a cutter secured to said spindle, an endwise movable sleeve surrounding the spindle and being substantially larger in size than the spindle, reciprocating means for moving said sleeve endwise, the spindle having an abutment against which the sleeve bears when moving away from the cutter and a thrust abutment against which the sleeve presses when moving toward the cutter, there being provisions for lost motion between the sleeve and said abutments, complementally tapered centering surfaces on the spindle and sleeve adjacent to the cutter arranged to be brought into contact when the sleeve is moved toward the cutter and to be separated when the sleeve is moved away, and yielding means acting on said cutter spindle tending to displace it laterally with respect to the sleeve.

23. A shaping machine comprising a work support, a spindle adapted to move endwise and rotatably beside a work piece mounted on the work support, a cutter secured to said spindle, an endwise movable sleeve surrounding the spindle and being substantially larger in size than the spindle, reciprocating means for moving said sleeve endwise, the spindle having an abutment against which the sleeve bears when moving away from the cutter and a thrust abutment against which the sleeve presses when moving toward the cutter, there being provisions for lost motion between the sleeve and said abutments, complementally tapered centering surfaces on the spindle and sleeve adjacent to the cutter arranged to be brought into contact when the sleeve is moved toward the cutter and to be separated when the sleeve is moved away, yielding means acting on said cutter spindle tending to displace it laterally with respect to the sleeve, a driving gear having a sliding and non-rotating connection with the spindle at a point remote from the cutter, a swiveled holder for said gear permitting swinging movement of the cutter carrying end of the spindle, and means for rotating said gear.

24. In a shaping machine an endwise movable and rotatable cutter spindle, a driving gear for rotating said spindle having a sliding connection therewith to permit such endwise movement, a swivel mounting for said gear permitting swinging movement of the shaft and means for applying force back and forth endwise to the spindle, said force-applying means and the spindle having complemental centering portions which are brought into engagement with movement in one direction, and are separated one from another with movement in the opposite direction, whereby to relieve the cutter carried by said spindle from the work.

25. In a shaping machine having a rotatable planing cutter of generally circular form with alternate projections and indentations in its periphery, a rotatable and endwise movable spindle carrying said cutter, means for reciprocating said spindle movable back and forth lengthwise of the spindle, the spindle having abutments embracing a part of said reciprocating means and between which said part plays with limited lost motion, said reciprocating means and the spindle having complementally tapered centering surfaces adjacent to that part of the spindle on which the cutter is mounted, means acting on said spindle tending to move the same at the cutter carrying part laterally with respect to the reciprocating means, a driving element for rotating the spindle having a sliding connection therewith, and a mount for said driving element pivoted to permit swinging movement of the spindle.

26. In a shaping machine an endwise movable and rotatable cutter spindle, means for rotating the same comprising a shaft section and a rotational drive therefor, said shaft section having a connection with the spindle permitting angular swinging movement of the spindle with respect thereto, and means for applying force endwise to the spindle including an element which surrounds a part of the spindle and has a centering portion complemental to a zone of the spindle, and there being provision for longitudinal lost motion between said force applying means and the spindle whereby to disengage and re-engage said complemental centering portions to permit relieving of the cutter carried by the spindle from the work.

27. In a metal planing machine the combination with a work holding means of a disk-like cutter having a dentate peripheral cutting edge, a spindle carrying said cutter and being both rotatable and movable endwise, means for moving said spindle back and forth endwise comprising a guide member embracing the spindle and abutments on the spindle between which said guide member is confined with provision for lost motion, the abutment toward the cutter being tapered and the guide member being complementally tapered, whereby to position the cutter during the cutting stroke and to permit relief of the cutter on the non-cutting stroke, and means for rotating said spindle.

28. In a metal planing machine, the combination of a rotatable and endwise movable cutter holder, a cutter carried by said holder, and means for reciprocating said holder comprising a guide member adjacent to said holder and movable back and forth lengthwise thereof with provisions for limited lost motion relatively thereto, said holder and guide member having complemental centering means adapted to hold the cutter in a given path during the cutting reciprocation, and to release the holder and permit the cutter to be relieved from the work during the return reciprocation.

29. In a metal planing machine, the combination of a rotatable and endwise movable cutter holder, a cutter carried by said holder, and means for reciprocating said holder comprising a guide member adjacent to said holder and movable back and forth lengthwise thereof with provisions for limited lost motion relatively thereto, said holder and guide member having complemental centering means adapted to hold the cutter in a given path during the cutting reciprocation, and to release the holder and permit the cutter to be relieved from the work during the return reciprocation, said centering means being operated to carry out the aforesaid effect by the lost motion of the guide member relatively to the cutter holder.

In testimony whereof I have affixed my signature.

EVERARD STUBBS.